(12) United States Patent
Kemnitz et al.

(10) Patent No.: US 11,554,625 B2
(45) Date of Patent: Jan. 17, 2023

(54) MPU AXLE SET WITH COMMON ECU

(71) Applicant: RAPA Automotive GmbH & Co. KG, Selb (DE)

(72) Inventors: Rocco Kemnitz, Selb (DE); Tim Rubitzko, Selb (DE); Werner Leupold, Selb (DE)

(73) Assignee: RAPA Automotive GmbH & Co. KG, Selb (DE)

( * ) Notice: Subject to any disclaimer, the term of this patent is extended or adjusted under 35 U.S.C. 154(b) by 0 days.

(21) Appl. No.: 16/920,987

(22) Filed: Jul. 6, 2020

(65) Prior Publication Data
US 2021/0008942 A1 Jan. 14, 2021

(30) Foreign Application Priority Data
Jul. 8, 2019 (DE) ...................... 10 2019 118 384.7

(51) Int. Cl.
*B60G 17/015* (2006.01)
*B60G 17/044* (2006.01)

(52) U.S. Cl.
CPC ....... *B60G 17/0152* (2013.01); *B60G 17/044* (2013.01); *B60G 2202/416* (2013.01); *B60G 2500/02* (2013.01)

(58) Field of Classification Search
CPC .............. B60G 17/015; B60G 17/0152; B60G 17/018; B60G 17/044; B60G 2202/416; B60G 2500/02; B60G 2300/60; B60G 113/14; B60G 17/08; F04C 2/08; F04C 2/10; F04C 14/02; F04B 17/03; F04B 23/04; H02K 7/06; H02K 11/33; H02K 2213/12; H02K 5/04; H02K 5/00; H02K 11/30
See application file for complete search history.

(56) References Cited

U.S. PATENT DOCUMENTS 9,174,508 B2 * 11/2015 Anderson ............... F16F 9/466
9,945,377 B2 4/2018 Pippes et al.
2007/0122298 A1 5/2007 Lesther et al.
(Continued)

FOREIGN PATENT DOCUMENTS

CN 211859906 U * 11/2020
DE 2 020 292 A1 11/1971
(Continued)

OTHER PUBLICATIONS

Description Translation for DE 102012204212 from Espacenet (Year: 2012).*
(Continued)

*Primary Examiner* — James A English
*Assistant Examiner* — Daniel M. Keck
(74) *Attorney, Agent, or Firm* — Maier & Maier, PLLC

(57) ABSTRACT

A device for supplying hydraulic energy in a chassis system of a vehicle includes a first hydraulic pump and a first electric motor for driving the first hydraulic pump, a second hydraulic pump and a second electric motor for driving the second hydraulic pump, and a common electronic unit which is arranged to control the first and the second electric motor, wherein the two electric motors and the two pumps are preferably designed to be identical in structure and/or respectively form first and second motor-pump groups.

12 Claims, 5 Drawing Sheets

(56) References Cited

U.S. PATENT DOCUMENTS

| | | | |
|---|---|---|---|
| 2008/0257626 A1 | 10/2008 | Carabelli et al. | |
| 2015/0308435 A1 | 10/2015 | Rosinski et al. | |
| 2015/0360532 A1* | 12/2015 | Kim .................. | H02K 7/14 |
| | | | 280/5.5 |
| 2016/0059664 A1 | 3/2016 | Tucker et al. | |
| 2018/0154723 A1 | 6/2018 | Anderson et al. | |

FOREIGN PATENT DOCUMENTS

| | | |
|---|---|---|
| DE | 39 02 743 C1 | 7/1990 |
| DE | 102012204212 A1 | 9/2013 |
| DE | 10 2013 109 522 A1 | 3/2015 |
| DE | 10 2014 103 958 A1 | 9/2015 |
| DE | 10 2014 103 959 A1 | 9/2015 |
| DE | 102015007479 A1 | 12/2015 |
| EP | 2 968 709 A2 | 1/2016 |
| EP | 3 144 472 A1 | 3/2017 |

OTHER PUBLICATIONS

Extended European Search Report dated Dec. 10, 2020, in connection with corresponding EP Application No. 20183706.9 (24 pp., including machine-generated English translation).

Examination Report dated Apr. 17, 2020 in corresponding German application No. 10 2019 118 3 84.7; 8 pages.

* cited by examiner

MPU AXLE SET WITH COMMON ECU

FIELD OF THE INVENTION

The present invention relates to a device for supplying hydraulic energy in an active chassis of a vehicle, a kit for such a device and a chassis system having such a device.

BACKGROUND OF THE INVENTION

Active chassis systems are known in principle, for example from DE 39 02 743 C1 or DE 2 020 292 A1. An active chassis has hydraulically controllable shock absorbers in which the two cylinder chambers or damper chambers of the working cylinder of a given shock absorber are connected to each other not only via one or several, where applicable controllable, damping or throttle valves, but in which the filling state of the cylinder chambers can be actively controlled and hydraulic forces can be introduced accordingly into the chassis as needed. For example, the two cylinder chambers of a shock absorber can be connected to each other via a hydraulic pump.

Hence, by pumping hydraulic fluid, for example pitching and/or rolling movements of the vehicle can be counteracted. Vice versa, such an arrangement of shock absorber, hydraulic pump and electric motor can in principle also be used to feed electrical energy obtained by recuperation back into the vehicle's onboard network. Furthermore, when using the pump different damping behaviours can be set, for example "soft" or "hard" or dynamic or depending on the road behaviour or the condition of the ground.

For controlling the electric motor of a given hydraulic pump, a corresponding control unit is usually provided here, thus creating a so-called motor-pump unit which has a pump, an electric motor and a drive unit (ECU, Electric Control Unit) and is often configured as a structural unit. It is known to provide for each shock absorber to be controlled exactly one motor-pump unit. Here, the corresponding motor-pump unit can be mounted directly to or at least close to the respective shock absorber. For reasons of installation space, however, this is not always possible, so that the corresponding motor-pump unit may have to be placed remote from the shock absorber in the vehicle. Attention must here be paid to the correct hydraulic connection and the correct electrical cabling.

SUMMARY OF THE INVENTION

The object of the invention is to create a device for supplying hydraulic energy in an active chassis system of a vehicle, which is adapted to be cost-effective and space-saving. It is a further object of the present invention to state a corresponding kit and a corresponding chassis system.

According to the invention, a device for supplying hydraulic energy in a chassis system of a vehicle is supplied, comprising
a first hydraulic pump and a first electric motor for driving the first hydraulic pump,
a second hydraulic pump and a second electric motor for driving the second hydraulic pump, and
a common electronic unit which is arranged to simultaneously control both the first electric motor and the second electric motor.
Here, both electric motors and both pumps preferably are each identical in structure or are identically designed, that is, they show the same properties and dimensions and/or preferably form first and second motor-pump groups.

The common electronic unit is electrically connected to both the first electric motor and the second electric motor and is arranged to simultaneously control both the first electric motor and the second electric motor and thus the respective pumps. The common electronic unit thus replaces (two) separate or distinct electronic or control units for the electric motors or the pumps, as they are employed for example in the known motor-pump units. Advantageously, the two electric motors are exclusively and completely controlled via the common electronic unit and/or are supplied with electrical energy thereby, so that the electric motors have no further electrical ports besides the electrical connection to the common electronic unit. Here, the two electric motors and the two pumps are preferably identical in structure or identically designed, that is, they have the same characteristics and dimensions. Furthermore, the common electronic unit usually forms one (single) or exactly one structural unit (structure unit). Accordingly, the common electronic unit is usually completely disposed in one single common housing, so that all components of the common electronic unit are disposed in a common housing.

The provision of a common electronic unit for both electric motors, according to the invention, enables various synergy effects.

In view of the structural construction of the common electronic unit, various components such as microcontrollers, capacitors, in particular high-voltage capacitors, electrical filter elements, in particular input and/or EMC filters, and power transistors can usually be used for both electric motors together, so that the number of these components is reduced compared with components built in in two separate control units for known motor-pump units. For example, in the common electronic unit, preferably exactly only one logic part and/or exactly one microcontroller is provided for controlling both electric motors. By the decreased number of components, the required installation space, the costs for structural members, and the mounting effort, among other things, are reduced.

In addition, in the common electronic unit the size or cardinality of the various components can usually be reduced compared to (the sum of) components built in in two control units for known motor-pump units (having comparable operating parameters), since it is often not necessary, for example, to guarantee that both electric motors or pumps operate at maximum power at the same time, or this is at least not permanently necessary. Preferably, for example, capacitors with a smaller total capacitance and/or power electronics with a smaller (continuous) power can be thus provided, which reduces the costs for structural members and also the required installation space. For example, the total capacitance of the (high-voltage) capacitors and/or the maximum (continuous) output power can be reduced by 25% or more, compared to the sum of the (high-voltage) capacitors built in in two control units for known motor-pump units with comparable operating parameters, in particular with identical continuous output power. Preferably, the maximum (continuous) output power of the entire power electronics of the common electronic unit is smaller than the sum of the maximum (continuous) powers of the first and second electric motor, for example smaller than or equal to 95%, 90%, 85%, 80%, 75%, 70%, 60% or 50%. Alternatively, also a maximum (continuous) output power of the power electronics of the common electronic unit may be provided which corresponds to 100% of the maximum (continuous) power of the first and second electric motor. Preferably, further, the maximum (continuous) power of the electric motor is in the range between 0.1 and 5 kW and is, for example, 0.1, 0.2, 0.5, 1, 1.5, 2, 2.5, 3, 4 or 5 kW, where each of the values mentioned can also represent an upper or lower limit of the value range mentioned. The operating pressure in the unloaded state is here preferably between 5 and 25 bar, where peak values of more than 200 bar may occur during operation. The delivery rate of the hydraulic fluid is here preferably in the range between 15 and 30 l/min with pressure differences at the two line ports of the pump port of up to 30 bar. In particular with higher pressure differences, the volume flow is also dependent on the power or size of the motor-pump group. With an electric motor having a power of between 3 and 5 kW or an outside diameter in the range between 90 and 120 mm, the volume flow is typically up to 10 l/min at a pressure difference in the range between 100 and 150 bar. The rotational speeds of the electric motor and thus also that of the hydraulic pump are proportional to the volume flow. The maximum rotational speeds are typically in the range between 5000 and 10,000 rpm.

Synergy effects will also arise when building in, in particular when cabling or electrically connecting the device of the invention, which preferably has exactly one control port, for example for a CAN bus, which can also include a supply voltage port, and exactly one power port, for example for 48V, which can also be adapted as a high-voltage port for e.g. 400V or 800V, which particularly preferably are each disposed directly at the common electronic unit. Thus, fewer connecting cables are required than in the case of two separate known motor-pump units, which also excludes an unintended interchanging. Accordingly, only exactly one electronic unit per axle needs to be coupled. Alternatively, also a plurality of control ports and/or power or high-voltage ports can be provided. In particular, it may be advantageous to provide two or more power ports, in particular in the case of a low supply voltage of, for example, 48V, in order to guarantee a sufficient power supply for the device of the invention.

Preferably, the electric motors are four-quadrant-capable or are configured as electric motor generator. This allows an alternating or alternate operation as an electric drive and/or as an electric generator (recuperation operation), with which, for example due to a pressure surge at the pump (for example due to a mechanical impact on a shock absorber) hydraulic energy can be recovered via the pump from the shock absorber or the chassis system as electrical energy.

In the simplest case, the electrical energy obtained as a result of the recuperation operation can be fed into an onboard network. However, the device of the invention having the common electronic unit also allows to feed a part of or all of the electrical energy recovered in one electric motor immediately and for example without a detour via the onboard network directly into the other electric motor. This allows a decrease of the amount of energy fed into the onboard network. Accordingly, electrical energy storage elements, for example in the onboard network, can be designed smaller and accordingly more cost-effective.

The first and/or second hydraulic pump is here preferably an internal gear pump, as this has a low mass inertia and a high volume efficiency and thus allows a highly dynamic alternating operation with minimal hysteresis and minimal energy losses. Alternating between generator operation and motor operation and vice versa here is preferably possible with a time resolution of up to 50 Hz and the control unit is also suitably configured for this purpose. In particular, the motor-pump units are preferably suitable to operate together with the damper both in the range of the vehicle bodywork frequency, up to 5 Hz, and in the range of the wheel frequency, up to 15 Hz. Internal gear pumps are known for example from DE 10 2014 103 958 A1 or DE 10 2014 103 959 A1, whose relevant disclosure content is incorporated into the present print.

Furthermore, the first and/or second hydraulic pump preferably has a pump port for hydraulically connecting respectively one assigned shock absorber of a chassis system. The pump port of a hydraulic pump respectively comprises or consists of in particular two line ports for coupling two port lines for connecting with two pressure chambers of a shock absorber. The device according to the invention is preferably used for hydraulically controlling the two shock absorbers of an axle of a chassis.

As only one electronic unit per axle has to be electronically connected with the vehicle, the number of electrical interfaces to the vehicle can be reduced, as already mentioned. The fixed assignment of the electronic unit to the hydraulic pumps enables the components to be individually coordinated to each other. For example, characteristic maps can be read in during the final check and individually adjusted to each other. This may facilitate, for example, a sensorless regulation of electric motors and even a sensorless pressure regulation.

Preferably, the electric motors are so-called wet rotors in which the rotor of the electric motor is in hydraulic oil. Preferably, the hydraulic oil pressure is absorbed via a so-called can, as described for example in the print DE 10 2013 109 522. The disclosure of the print DE 10 2013 109 522 concerning this construction is accordingly incorporated in the disclosure content of the present print.

Preferably, the first hydraulic pump and the first electric motor and/or the second hydraulic pump and the second electric motor are respectively firmly mechanically connected to each other and respectively form a compact structural unit, which is/are hereinafter referred to as a motor-pump group. Preferably, electric motor and pump are disposed directly adjacent and respectively have for example corresponding surfaces, preferably plane front surfaces, as common boundary surfaces. The structurally firm connection of electric motor and hydraulic pump is created, for example, by a direct screwed connection of motor and pump, by one or several connecting structural members, by a common support and/or by a common housing in which electric motor and pump are then disposed, the housing preferably being substantially or completely closed and particularly preferably tight, for example watertight or splashtight.

Here, the two motor-pump groups are preferably identical in structure, that is, they are designed to have respectively the same properties and dimensions or are identically.

Furthermore, a motor-pump group preferably has a longitudinal direction or longitudinal axis, which is preferably defined by a (straight) motor axle shaft of the respective electric motor, with which the electric motor drives the respective hydraulic pump (or vice versa). Here, the side of the pump and/or electric motor facing away from the motor-pump unit can be configured as a plane front surface, which promotes a further structural integration of the motor-pump group. Furthermore, it is advantageous to dispose the pump port on the side of the pump facing away from the motor-pump group or within the plane front surface of the pump.

Preferably, a motor-pump group or the structural unit created thereby has a total length along the respective longitudinal axis in the range between 10 and 30 cm, which is preferably 10, 12, 15, 20, 25 or 30 cm, where each of the values mentioned can also represent an upper or lower limit of the value range mentioned. Furthermore, preferably, the motor-pump groups have a completely or substantially cylindrical or cuboid outer shape around the respective longitudinal axis, or two separate or one common cylindrical or cuboid housing, with a (maximum) diameter or edge length (transverse to the longitudinal axis) in the range between 60 and 150 mm, which is preferably 60, 70, 80, 90, 100, 110, 120, 130 or 150 mm, where each of the values mentioned can also represent an upper or lower limit of the value range mentioned. The housing is preferably configured to be substantially or completely closed and particularly preferably tight, for example watertight or splashtight, and/or shielding against electromagnetic radiation. Furthermore, the housing is preferably of a one-piece or one-part or, where applicable, of a multi-piece configuration and forms in particular a mechanically stable unit.

Preferably, the different structural units of the device of the invention, that is, both motor-pump groups or both pumps and both electric motors and the common electronic unit, are firmly connected to each other, for example flanged to each other, and form an integral structural unit, also referred to as axle set in the following. Accordingly, such an axle set is a pre-mountable or pre-mounted device which accordingly reduces the mounting effort when being attached to an axle or when the device of the invention is installed in a vehicle. In particular, mounting time, mounting steps, fastening points and/or holding means can be saved. This also simplifies a pre-mounting of a complete axle of a motor vehicle having active chassis or active shock absorbers.

The mechanically firm connection of the various structure units (electric motors, pumps, common electronic unit, motor-pump groups) of the device of the invention or of the axle set can be effected as described above in connection with the motor-pump groups. For example, respectively two or more structure units are disposed directly adjacent and then have for example respectively corresponding surfaces, preferably plane front surfaces, as boundary surfaces. The firm connection of the structural units can then be created by a direct screwed connection, by one or more connecting structural members, by a common support and/or by a common housing or outer housing, in which then preferably all structural units of the axle set or at least the electric motors and the common electronic unit are disposed and which is preferably substantially or completely closed and particularly preferably tight, for instance watertight or splashtight, and/or is configured to shield electromagnetic radiation. Such a common housing of the axle set preferably has a cylindrical or cuboid outer shape. Furthermore, the housing is preferably of a one-piece or one-part or, where applicable, of a multi-piece configuration and forms in particular a mechanically stable unit.

Preferably, the various structure units are disposed in the axle set or in the device of the invention in such a way that the common electronic unit is structurally directly adjacent to both electric motors of the two motor-pump groups and that preferably the common electronic unit and the two electric motors respectively have common boundary surfaces. This shortens the paths, for example between the power electronics and the electric motors, thereby reducing the EMC load and minimizing power losses caused by the path. The electronic unit can be directly connected to the electric motors upon mounting, for example by means of plug connections which are directly connected upon mounting. Preferably, for example motor phase contacts of the electric motors protrude into the common electronic unit. For this purpose, for example the motor phase contacts of the electric motors protrude beyond a housing of the respective electric motor or the respective motor-pump group at a position where the common electronic unit is disposed and thus into the common electronic unit or a housing thereof. It is to be understood that any suitable electrical connection between the electronic unit and the electric motors can be employed. A short link of the electronic unit to the electric motors is here also advantageous with regard to the electromagnetic behaviour, as the electrical lines are short and better shielded or can be shielded better. In addition, this helps to avoid errors that may occur with complex cabling.

The relative arrangement of the structure units to each other in the axle set and, where applicable, the external shape of the housing of the axle set can be selected depending on the installation conditions or installation space conditions.

In a first preferred embodiment of the axle set, the longitudinal axes of both motor-pump groups are on a common axis which forms a longitudinal axis or common longitudinal axis of the device or axle set of the invention, which is described in the following as the axial arrangement of the motor-pump groups. Here, the hydraulic pumps, and preferably also the pump ports, are respectively disposed on sides of the respective motor-pump groups facing away from each other, so that the respective electric motors are disposed between the pumps of the respective motor-pump groups. Preferably, the common electronic unit is directly adjacent to both electric motors. Accordingly, the device of the invention in the present case has an elongated construction with a total length (measured, for example, between the pump ports and/or pump end surfaces or exterior front surfaces of the two pumps) along the common longitudinal axis in the range between 20 and 90 cm, which is for example 20, 30, 40, 41.2, 50, 60, 70, 80 or 90 cm, where each of the mentioned values may also represent an upper or lower limit of the mentioned value range. Accordingly, the two motor-pump groups or the opposing ends of the motor-pump groups facing away from the respective pump side, at which there are usually located the electro motors and which for example are configured as plane front surfaces, have a distance along the common longitudinal axis of 0 to 30 cm, which for example is 0, 1, 2, 3, 5, 7, 10, 15, 20 or 30 cm, where each of the mentioned values can also represent an upper or lower limit of the mentioned value range.

Such an axial arrangement minimizes the distance between the pump ports and the respective shock absorbers and thus the length of the corresponding pressure lines, which decreases costs for structural members and minimizes line-related fluid dynamic effects.

In a first preferred embodiment of the axle set with axial arrangement of the motor-pump groups, the common electronic unit is also disposed on the common longitudinal axis and here completely or at least partly axially and/or radially between the motor-pump groups.

In the first case, the common electronic unit does not protrude radially beyond the motor-pump groups and is disposed completely in the space between the two motor-pump groups, so that the common electronic unit has, for example, a (largest) diameter which is smaller than or equal to the diameter of the motor-pump groups or its external shape, the common electronic unit preferably being directly adjacent to both electric motors. Preferably, the axle set or the device according to the invention accordingly has a preferably continuous outer shape (in which, for example, the various structure units or their respective housings are flush and directly adjoin each other) or a common housing in which all structure units of the device according to the invention are disposed, which is cylindrical or is cylindershaped with a diameter which is constant along the longitudinal axis or cuboid with an edge length transverse to the longitudinal axis which is constant along the longitudinal axis, which lies in the range between 60 and 150 mm and is preferably 60, 70, 80, 90, 100, 110, 120, 130 or 150 mm, where each of the mentioned values can also represent an upper or lower limit of the mentioned value range. Accordingly, the electric motors preferably have a distance from each other along the longitudinal axis, which is equal to the axial width of the common electronic unit.

Alternatively, the common electronic unit can also be disposed partly or completely radially exterior on and/or relative to the motor-pump groups. Also in this case, the common electronic unit is preferably directly adjacent to the electric motors, for example at a common plane or cylindrical boundary surface and is flanged thereto for example in a radially exterior or lateral manner. If the common electronic unit is disposed completely radially exterior, the distance between the electric motors may be zero, that is, the electric motors are directly adjacent to each other, for example at a plane boundary surface or front surface extending perpendicular to the longitudinal axis. In this way, the overall length of the axle set or of the device according to the invention can be reduced. Alternatively, the distance between the electric motors can also be different from zero, leaving the installation space between the electric motors free for cooling purposes, for example.

Alternatively, the common electronic unit is disposed partly radially exterior relative to the motor-pump groups or their outer shape(s), that is, protruding radially beyond the outer shapes and at the same time partly radially interior, and accordingly fills the installation space between the electric motors partly or completely. Preferably, the common electronic unit has an outer shape which is at least substantially T-shaped in longitudinal section or a housing which is at least substantially T-shaped in longitudinal section, the central portion of which is disposed in the space between the electric motors and the side portions of which are disposed radially exterior, preferably directly on the electric motors and partly or completely cover these in the axial direction, the sides facing the motor-pump groups corresponding to the respective outer shape of the motor-pump groups and, for example, being of concave or cylinder-segment-shaped configuration.

This results in a particularly large installation space for the common electronic unit and allows, for example, structural members, in particular electronic structural members, having large dimensions to be built in in the electronic unit without increasing the radial installation space. In this case, the distance between the electric motors is preferably between 5 and 10 cm and is, for example, 5, 6, 8 or 10 cm, where each of the values mentioned can also represent an upper or lower limit of the value range mentioned.

Alternatively, the common electronic unit, in the axial direction, can be disposed completely between the electric motors or the motor-pump groups and still be disposed partly radially exterior and partly radially interior relative to the motor-pump groups or their outer shape. Also in this case, structural members having large dimensions can be built in in the common electronic unit.

In an alternative, preferred embodiment, the longitudinal axes of the two motor-pump groups are parallel to each other (and do not coincide) and/or the motor-pump groups or their longitudinal axes are aligned parallel or anti-parallel, preferably in such a way that the two motor-pump groups are shifted in the direction of the longitudinal axes or, particularly preferably, are disposed flush. When the motor-pump units are aligned parallel, the pump-side ends of the two motor-pump groups lie in a common plane which is perpendicular to the longitudinal axes of the motor-pump groups, and the electric-motor-side ends of the two motor-pump groups lie in a further common plane which is likewise perpendicular to the longitudinal axes of the motor-pump groups. Here, the further common plane forms preferably the boundary surface with the common electronic unit. In the case of an anti-parallel alignment of the motor-pump groups, the pump-side end of one of the two motor-pump groups preferably lies in a common plane with the electric-motor-side end of the respectively other motor-pump group, this plane being perpendicular to the longitudinal axes of the motor-pump units, and the common electronic unit is preferably disposed laterally.

According to a further aspect of the invention, a kit for supplying the device according to the invention is provided, which comprises the common electronic unit and the first hydraulic pump and the first electric motor and/or the first motor-pump group as well as the second hydraulic pump and the second electric motor and/or the second motor-pump group. In particular, the first and second electric motor can respectively have a front side that is arranged for mutual mounting to each other. Furthermore, the common electronic unit may be arranged to be mounted on both the first electric motor and the second electric motor so that it is electrically connected to both the first electric motor and the second electric motor.

Furthermore, the kit preferably comprises one or several connecting structural members, a common support and/or a common housing which can be designed as described above and in which preferably all the structure units of the device of the invention are provided for arrangement.

A chassis system according to the invention for a vehicle comprises at least a first and a second hydraulically controllable shock absorber respectively having two damper or pressure chambers separated for example by a movable damper piston, which are preferably assigned to a common chassis axle or are disposed at this axis, as well as a device as described above for supplying hydraulic energy in a chassis system of a vehicle, the first motor-pump group or the first hydraulic pump hydraulically connecting the pressure chambers of the first shock absorber to each other and the second motor-pump group or the second hydraulic pump hydraulically connecting the pressure chambers of the second shock absorber to each other. In this way, for example, "soft" or "hard" damping can be set by, for example, the respective motor-pump unit more or less damping or throttling pressure surges from the chambers. In this case, the respective motor-pump unit is thus driven hydraulically, so that the electric motor can be operated as an electric motor generator and thus electrical energy can be recovered (recuperation). Furthermore, also the zero or rest position of the shock absorber can be actively set or set in targeted fashion and can also be changed during operation (active chassis). It is understood that the chassis system may have one or several further axles, each of which respectively may be equipped with a further device of the invention for controlling the corresponding shock absorbers.

In the chassis system according to the invention, the length of the hydraulic lines between a motor-pump unit or its pump and the shock absorber is preferably in the range between 10 and 150 cm, which is, for example, 10, 20, 30, 40, 50, 60, 70, 80, 90, 100, 120 or 150 cm, where each of the mentioned values may also represent an upper or lower limit of the mentioned value range.

BRIEF DESCRIPTION OF THE DRAWINGS

The invention will hereinafter be described with reference to the attached drawings. The drawings are merely schematic representations and the invention is not limited to the specific embodiment examples shown.

DETAILED DESCRIPTION

Figure 1:
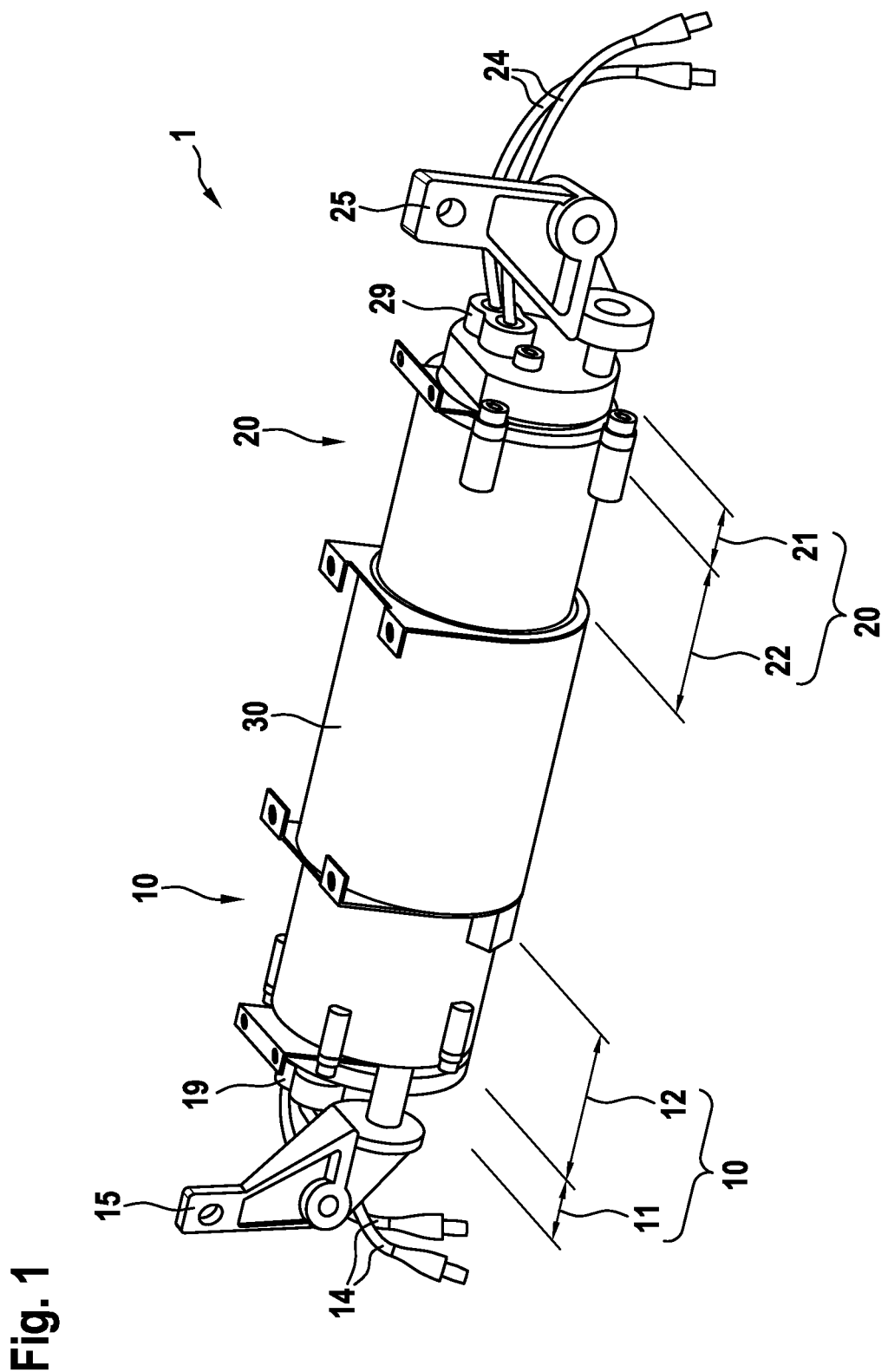
FIG. 1 shows a perspective view of a first embodiment example of the device according to the invention.

FIG. 1 shows a perspective view of a first embodiment example of a device 1 according to the invention for supplying hydraulic energy in an active chassis system 2 of a vehicle. The device comprises a first 10 and a second 20 motor-pump group which are identical in structure or are designed identically and respectively comprise a hydraulic internal gear pump 11, 21 and an electric motor or electric motor generator 12, 22. Each of the motor-pump groups 10, 20 forms a structural unit with a continuously closed, splashtight outer shell or outer housing in which the pump 11, 21 and the electric motor 12, 22 are disposed in a row along a longitudinal direction of the respective motor-pump group 10, 20. The longitudinal direction of a motor-pump group 10, 20 is here defined by an inside straight motor axle shaft (not shown), with which the electric motor 12, 22 drives the respective pump 11, 21. The pumps 11, 21 each have a pump port 19, 29 with two line ports, into which in the present embodiment examples two port lines 14, 24 are incorporated respectively, which are provided for the coupling to the two pressure chambers of a shock absorber 16, 26 of an active chassis system 2, respectively. In the first embodiment example, the two motor-pump groups 10, 20 are disposed in an axial arrangement, that is, their respective longitudinal axes coincide and define the common longitudinal axis of the device 1 of the invention.

Between the electric motors 12, 22 of the two motor-pump groups 10, 20, also a common electronic unit 30 (ECU, Electronic Control Unit) is disposed on the common longitudinal axis, which in the embodiment example shown is completely disposed between the two electric motors 12, 22 and does not protrude radially beyond the motor-pump groups. The common electronic unit 30 here has at both opposite axial ends respectively plane front surfaces which engage at corresponding axial ends of the electric motors 12, 22, which likewise respectively have plane front surfaces, and are flanged thereto.

The device 1 according to the invention thus forms a structural unit in which the various structure units are firmly connected to each other or are flanged to each other and are disposed in the following order: first hydraulic pump 11, first electric motor 12, common electronic unit 30, second electric motor 22, second hydraulic pump 21.

In the first embodiment example, the two motor-pump groups 10, 20 are firmly connected via the common electronic unit 30 flanged to each of them. Alternatively or in addition to the embodiment of the device 1 according to the invention, a support 30' schematically shown in FIG. 2 may also be provided, for example in the form of a common housing in which all the structure units of the device 1 according to the invention are disposed. In the embodiment example shown, receiving means 15, 25 are further provided for attaching the device according to the invention in a vehicle, for example in the vicinity of or at a vehicle axle or chassis axle 3.

In the first embodiment example, the device 1 according to the invention has a total length, from a pump port 19 to the opposing pump port 29, of 41.2 cm along the common longitudinal axis and, apart from fastening means, a substantially cylindrical outer shape having a diameter of approx. 120 mm Here, advantageously, the longitudinal axis of the device 1 according to the invention is parallel to the chassis axle 3 or to a connecting line of the wheels 18, 28 assigned to a chassis axle. This minimizes the distance of the pump ports 19, 29 to the respective shock absorbers.

Figure 2:
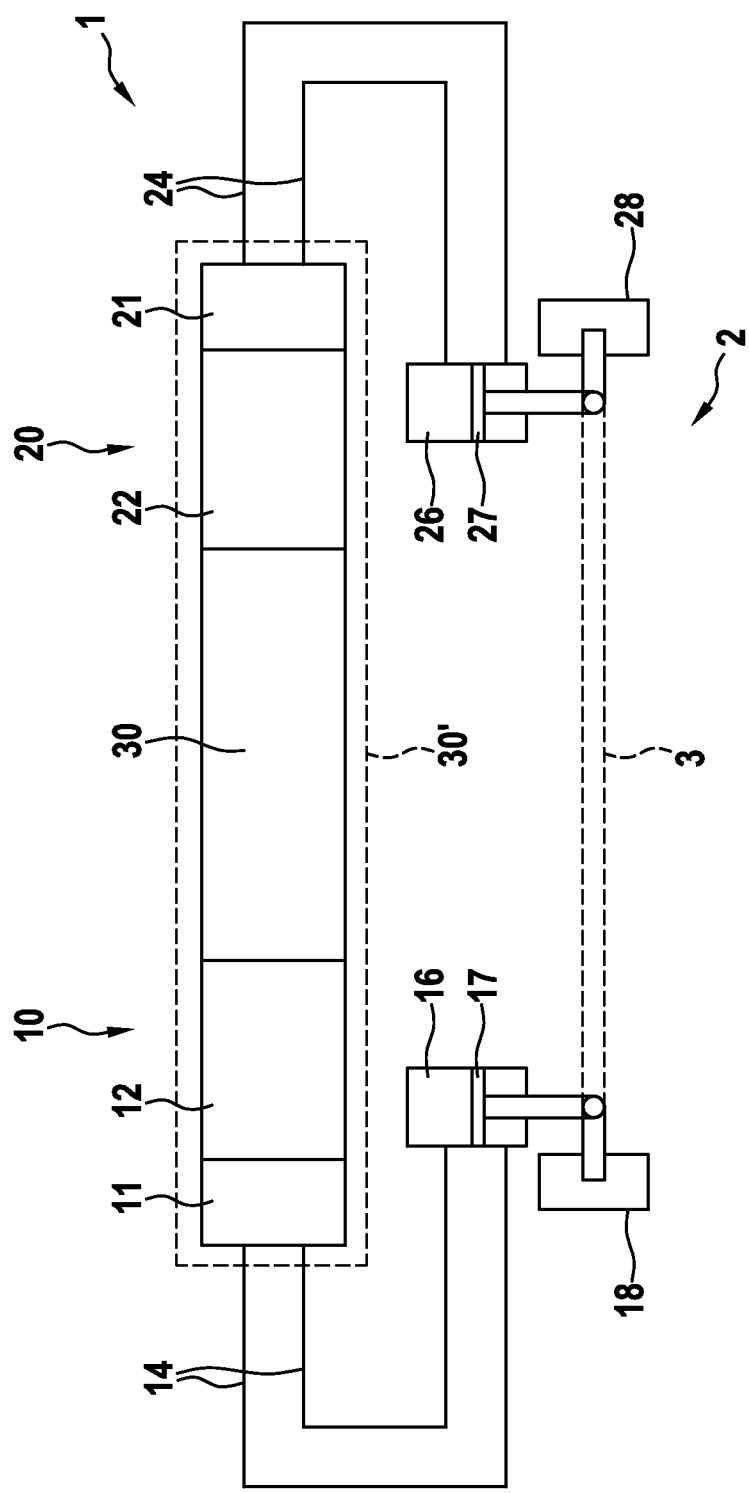
FIG. 2 shows a schematic view of a chassis system having a device according to the invention according to the first embodiment example.

In FIG. 2, a chassis system 2 having a device 1 according to the invention is schematically represented according to the first embodiment example. Herein, the respectively two hydraulic lines 14, 24 respectively coming from the pumps 11, 21 are connected with the two pressure chambers of respectively one shock absorber 16, 26, which pressure chambers in the simplest case are separated by a piston 17, 27 adapted to axially travel in a damper cylinder. In the embodiment example shown, the cylinders of the shock absorbers 16, 26 are connected with the spring-suspended mass of the vehicle or body, while the piston 17, 27 is connected or coupled with the unsuspended mass of the vehicle or a wheel 18, 28 and, where applicable, also to a chassis axle 3, if present. However, this can also be designed vice versa. Furthermore, in the schematic diagram in FIG. 2, the spring elements usually provided in addition, such as an air and/or steel spring element, have been omitted.

Figure 3:
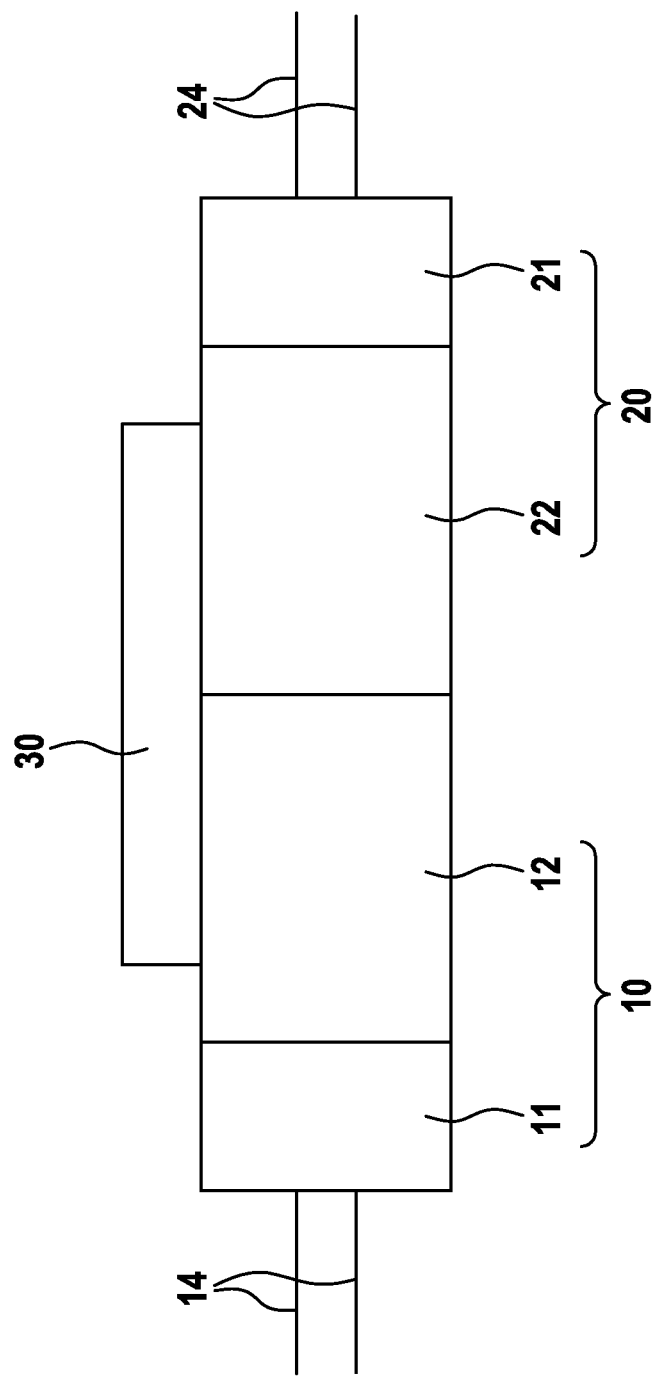
FIG. 3 shows a schematic view of a second embodiment example of the device according to the invention.

FIG. 3 shows a schematic view of a second embodiment example of the device 1 according to the invention, in which the two motor-pump groups 10, 20 again are disposed in an axial arrangement on a common longitudinal axis. In contrast to the first embodiment example, however, here the two electric motors 12, 22 are directly adjacent to each other, while the common electronic unit 30 is disposed laterally on both electric motors 12, 22, for example flanged thereto.

Figure 4:
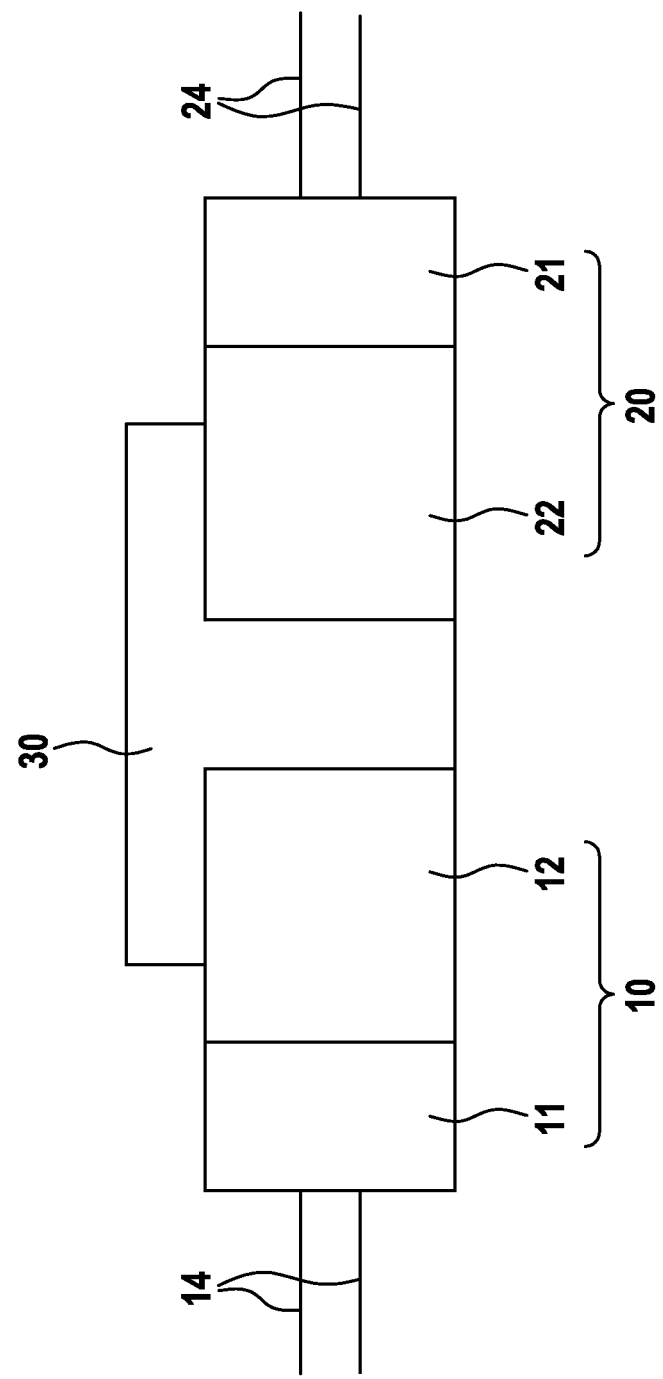
FIG. 4 shows a schematic view of a third embodiment example of the device according to the invention.

FIG. 4 shows a schematic view of a third embodiment example of the device 1 according to the invention, in which the two motor-pump groups 10, 20 again are disposed in an axial arrangement on a common longitudinal axis. In contrast to the first two embodiment examples, the common electronic unit 30 is here disposed partly laterally, that is, radially exterior on the electric motors, and partly between the electric motors, that is, on the longitudinal axis, so that in the longitudinal section shown there results a T-shaped outer shape, in particular a T-shaped housing for the common electronic unit 30.

Figure 5:
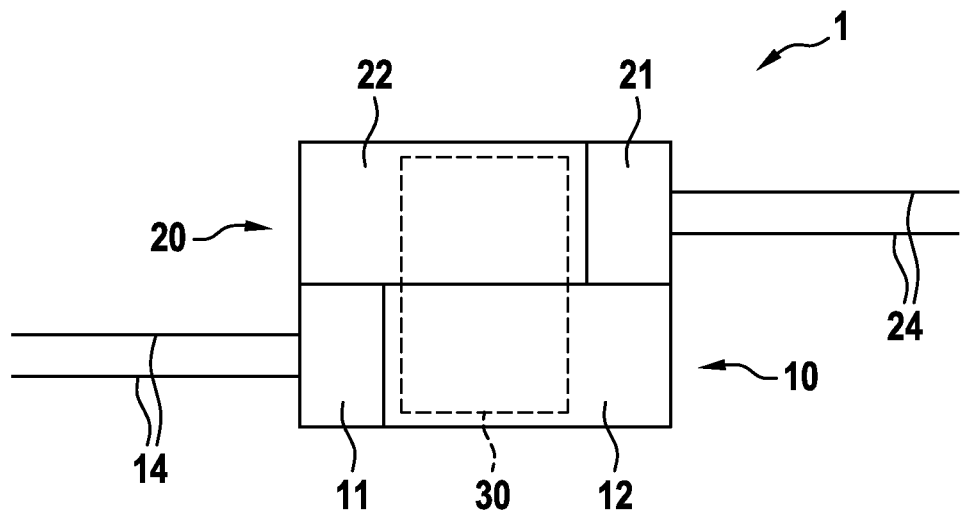
FIG. 5 shows a schematic view of a fourth embodiment example of the device according to the invention.

FIG. 5 shows a schematic view of a fourth embodiment example of the device 1 according to the invention, in which the longitudinal axes of both motor-pump groups 10, 20 lie parallel, but in contrast to the first embodiment example do not coincide. The two motor-pump groups 10, 20 here are disposed flush and anti-parallel, that is, the pumps 11, 21 and the respective pump ports 19, 29 face opposite sides facing away from each other. In the third embodiment example, the common electronic unit 30 is flanged laterally to both motor-pump groups 10, 20 and spans at least partly both electric motors 12, 22. It is advantageous to dispose the device 1 according to the invention of the fourth embodiment example in the vehicle or chassis system 2 in such a way that the parallel longitudinal axes of the two motor-pump units 10, 20 are also parallel to the chassis axle 3. However, in comparison to the first embodiment example, here the total length of the device 1 according to the invention along the longitudinal axis is decreased, substantially to the length of a motor-pump group 10, 20, whereby, where applicable, an installation space available in the vehicle can be better utilized.

Figure 6:
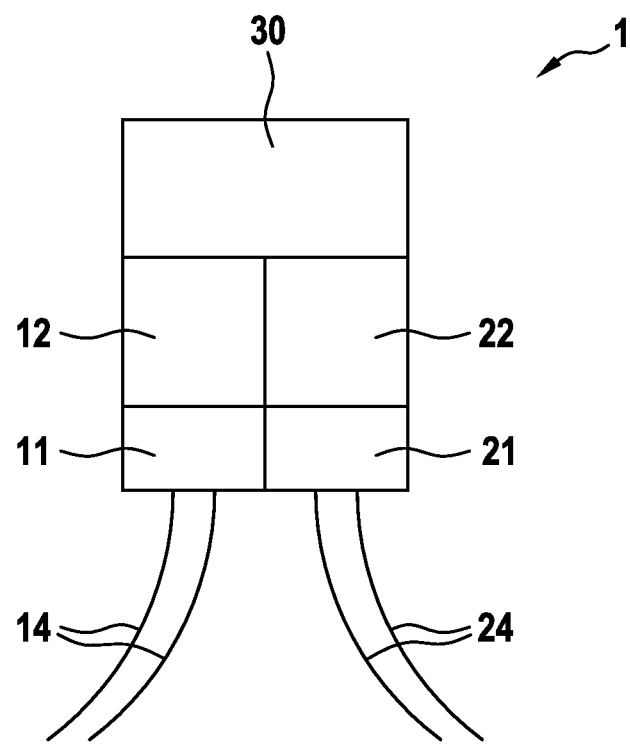
FIG. 6 shows a schematic view of a fifth embodiment example of the device according to the invention.

FIG. 6 shows a schematic view of a fifth embodiment example of the device 1 according to the invention, in which the longitudinal axes of both motor-pump groups 10, 20 again are parallel and do not coincide. The two motor-pump groups 10, 20 are also aligned flush but parallel. Accordingly, the pump-side ends of the two motor-pump groups 10, 20 are disposed in a first plane which is perpendicular to the longitudinal axes of the two motor-pump groups 10, 20, while the electric-motor-side ends of the motor-pump groups 10, 20 are disposed in a further common plane which is also perpendicular to the longitudinal directions of the motor-pump units 10, 20. The common electronic unit 30 is flanged to the electric-motor-side ends of the motor-pump groups 10, 20 and spans both electric motors 12, 22. Here, the longitudinal axes of the two motor-pump groups 10, 20 advantageously are aligned perpendicular to a chassis axle 3.

The invention claimed is:

1. A device for supplying hydraulic energy in a chassis system of a vehicle, comprising:
   a first hydraulic pump and a first electric motor configured to drive the first hydraulic pump;
   a second hydraulic pump and a second electric motor configured to drive the second hydraulic pump; and
   a common electronic unit which is configured to control the first electric motor and the second electric motor, wherein the first hydraulic pump and the first electric motor form a first motor-pump group being a compact structural unit with a first common housing, the second hydraulic pump and the second electric motor form a second motor-pump group being a compact structural unit with a second common housing, each structural unit having a longitudinal direction or a longitudinal axis which is defined by a motor axle shaft of the respective electric motor, the longitudinal axes of both motor-pump groups lie on a common axis which forms a longitudinal axis of the device, both motor-pump groups and the common electronic unit are mechanically firmly connected to each other, the common electronic unit has a T-shaped longitudinal section, and the electric motors are four-quadrant-capable and are configured as an electric motor generator.

2. The device according to claim 1, wherein a maximum output power of power electronics of the common electronic unit is smaller than or equal to a sum of a maximum power of the two electric motors.

3. The device according to claim 1, wherein the maximum power of the two electric motors respectively is in the range between 0.1 and 5 kW.

4. The device according to claim 1, wherein the hydraulic pumps respectively have a pump port and/or are configured as internal gear pumps.

5. The device according to claim 1, wherein both electric motors and the common electronic unit form a pre-mounted unit.

6. The device according to claim 5, wherein the hydraulic pumps respectively face away from each another.

7. The device according to claim 6, wherein the common electronic unit is disposed on the common axis.

8. The device according to claim 6, wherein the common electronic unit is disposed partly radially exterior and partly radially interior on the motor-pump groups.

9. The device according to claim 6, wherein an axial distance of the electric motors is in a range between 5 cm and 10 cm.

10. A kit for supplying the device according to claim 1, further comprising:
    the common electronic unit, the first hydraulic pump, the second hydraulic pump, the first electric motor, and the second electric motor as well as connecting structural members.

11. A vehicle axle comprising the device according to claim 1, wherein the vehicle axle is pre-mounted.

12. A chassis system for a vehicle, comprising:
    a device configured to hydraulic energy, comprising:
    a first hydraulic pump and a first electric motor configured to drive the first hydraulic pump,
    a second hydraulic pump and a second electric motor configured to drive the second hydraulic pump, and
    a common electronic unit which is configured to control the first electric motor and the second electric motor, wherein the common electronic unit has a T-shaped longitudinal section, both electric motors and the common electronic unit are mechanically firmly connected to each other, and the electric motors are four quadrant-capable and configured as an electric motor generator; and
    at least a first and second hydraulically controllable shock absorber, wherein a first motor-pump group hydraulically connects pressure chambers of the first shock absorber and a second motor-pump group hydraulically connects pressure chambers of the second shock absorber.

* * * * *